(12) United States Patent
Kent, Jr. et al.

(10) Patent No.: US 8,543,637 B2
(45) Date of Patent: Sep. 24, 2013

(54) DISTRIBUTED WEB PUBLISHING

(75) Inventors: Larry G. Kent, Jr., Loganville, GA (US); Bruce Peterson, Flowery Branch, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 798 days.

(21) Appl. No.: 11/619,329

(22) Filed: Jan. 3, 2007

(65) Prior Publication Data

US 2007/0168490 A1 Jul. 19, 2007

Related U.S. Application Data

(60) Provisional application No. 60/759,731, filed on Jan. 18, 2006.

(51) Int. Cl.
*G06F 15/16* (2006.01)

(52) U.S. Cl.
USPC .......................................................... 709/203

(58) Field of Classification Search
USPC ........................ 709/203, 204, 206; 713/176
See application file for complete search history.

(56) References Cited

U.S. PATENT DOCUMENTS

| | | | | | |
|---|---|---|---|---|---|
| 6,119,167 | A * | 9/2000 | Boyle et al. | ................... | 709/234 |
| 6,256,739 | B1 * | 7/2001 | Skopp et al. | ...................... | 726/2 |
| 6,907,447 | B1 * | 6/2005 | Cooperman et al. | .......... | 709/203 |
| 7,149,704 | B2 * | 12/2006 | Martin et al. | ................ | 705/7.32 |
| 7,158,936 | B2 * | 1/2007 | Denenberg et al. | ........ | 704/270.1 |
| 7,170,863 | B1 * | 1/2007 | Denman et al. | ............... | 370/260 |
| 7,552,338 | B1 * | 6/2009 | Swildens et al. | .............. | 713/176 |
| 7,599,938 | B1 * | 10/2009 | Harrison, Jr. | ................. | 705/7.29 |
| 7,644,181 | B2 * | 1/2010 | Plata Andres et al. | ........ | 709/239 |
| 7,668,917 | B2 * | 2/2010 | Netsch et al. | .................. | 709/206 |
| 7,882,032 | B1 * | 2/2011 | Hoffman | ......................... | 705/50 |
| 2002/0099723 | A1 * | 7/2002 | Garcia-Chiesa | ............. | 707/200 |
| 2002/0171650 | A1 * | 11/2002 | Prabhakaran | ................. | 345/530 |
| 2002/0184319 | A1 * | 12/2002 | Willner et al. | ................ | 709/206 |
| 2003/0005123 | A1 * | 1/2003 | Trabelsi et al. | ............... | 709/225 |
| 2004/0068574 | A1 * | 4/2004 | Costa Requena et al. | .... | 709/230 |
| 2004/0078445 | A1 * | 4/2004 | Malik | ............................ | 709/206 |
| 2004/0162886 | A1 * | 8/2004 | Ims et al. | ...................... | 709/213 |
| 2005/0080866 | A1 * | 4/2005 | Kent et al. | ..................... | 709/207 |
| 2005/0080868 | A1 * | 4/2005 | Malik | ............................ | 709/207 |
| 2005/0120024 | A1 * | 6/2005 | Tharpe et al. | ................... | 707/10 |
| 2005/0171999 | A1 * | 8/2005 | Bond et al. | .................... | 709/203 |

(Continued)

FOREIGN PATENT DOCUMENTS

WO WO 2006034384 A1 * 3/2006

*Primary Examiner* — Krisna Lim
*Assistant Examiner* — Margishi Desai
(74) *Attorney, Agent, or Firm* — Woodcock Washburn LLP

(57) ABSTRACT

Embodiments of the present disclosure provide systems and methods for publishing content over a network. Briefly described, in architecture, one embodiment of the system, among others, can be implemented as follows. The system includes an instant messaging module configured to generate a request for creation of a base uniform resource locator from an instant messaging server and configured to receive the base uniform resource locator. The instant messaging module is further configured to form an enhanced uniform resource locator by adding information to the base uniform resource locator to identify content stored on a local machine hosting the instant messaging module. The system also includes a local web server module configured to deliver the content stored on the local machine identified by the enhanced uniform resource locator, where the local machine hosts the local web server module. Other systems and methods are also provided.

24 Claims, 19 Drawing Sheets

(56) References Cited

U.S. PATENT DOCUMENTS

| | | | |
|---|---|---|---|
| 2005/0223073 A1* | 10/2005 | Malik | 709/206 |
| 2006/0072721 A1* | 4/2006 | Wisniewski | 379/88.22 |
| 2006/0098621 A1* | 5/2006 | Plata Andres et al. | 370/352 |
| 2006/0168056 A1* | 7/2006 | Gandhi et al. | 709/206 |
| 2006/0242238 A1* | 10/2006 | Issa | 709/204 |
| 2006/0251054 A1* | 11/2006 | Peters et al. | 370/352 |
| 2006/0277196 A1* | 12/2006 | Oosawa et al. | 707/10 |
| 2007/0006308 A1* | 1/2007 | Desouza et al. | 726/24 |
| 2007/0050821 A1* | 3/2007 | Toshikage et al. | 725/62 |
| 2007/0107019 A1* | 5/2007 | Romano et al. | 725/80 |
| 2007/0136279 A1* | 6/2007 | Zhou et al. | 707/6 |
| 2007/0136415 A1* | 6/2007 | Behl et al. | 709/203 |
| 2007/0289006 A1* | 12/2007 | Ramachandran et al. | 726/10 |
| 2008/0005064 A1* | 1/2008 | Sarukkai | 707/3 |
| 2008/0066080 A1* | 3/2008 | Campbell | 719/314 |
| 2008/0209345 A1* | 8/2008 | Cannata et al. | 715/751 |
| 2008/0288467 A1* | 11/2008 | Szeto et al. | 707/3 |
| 2009/0012964 A1* | 1/2009 | Ahn | 707/10 |

\* cited by examiner

//\# DISTRIBUTED WEB PUBLISHING

CROSS-REFERENCE TO RELATED APPLICATION

This application claims priority to U.S. provisional application entitled, "Web Hosting," having Ser. No. 60/759,731, filed Jan. 18, 2006, which is entirely incorporated herein by reference.

TECHNICAL FIELD

The present disclosure is generally related to network communications and, more particularly, is related to web hosting and publishing.

BACKGROUND

Generally with web hosting and browsing, someone who is browsing the Internet using a web browser is served content that is generally hosted on a machine on the Internet. Accordingly, content that is not hosted on the Internet is not generally available for those browsing the Internet to view.

Thus, a heretofore unaddressed need exists in the industry to address the aforementioned deficiencies and inadequacies.

SUMMARY

Embodiments of the present disclosure provide systems and methods for publishing content over a network. Briefly described, in architecture, one embodiment of the system, among others, can be implemented as follows. The system includes an instant messaging module configured to generate a request for creation of a base uniform resource locator from an instant messaging server and configured to receive the base uniform resource locator. The instant messaging module is further configured to form an enhanced uniform resource locator by adding information to the base uniform resource locator to identify content stored on a local machine hosting the instant messaging module. The system also includes a local web server module configured to deliver the content stored on the local machine identified by the enhanced uniform resource locator, where the local machine hosts the local web server module.

Embodiment of the present disclosure can also be viewed as providing methods for publishing content over a network. In this regard, one embodiment of such a method, among others, can be broadly summarized by the following: receiving a request for creation of a uniform resource locator from a first user; assigning a base uniform resource locator to the first user that requested the uniform resource locator, wherein the base uniform resource locator comprises a portion of the uniform resource locator; receiving a request to retrieve content identified by the uniform resource locator; parsing the uniform resource locator to determine identification of the first user; and forwarding the request to retrieve content to a local machine of the first user so that the local machine of the first user establishes a connection with a remote machine requesting the content.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
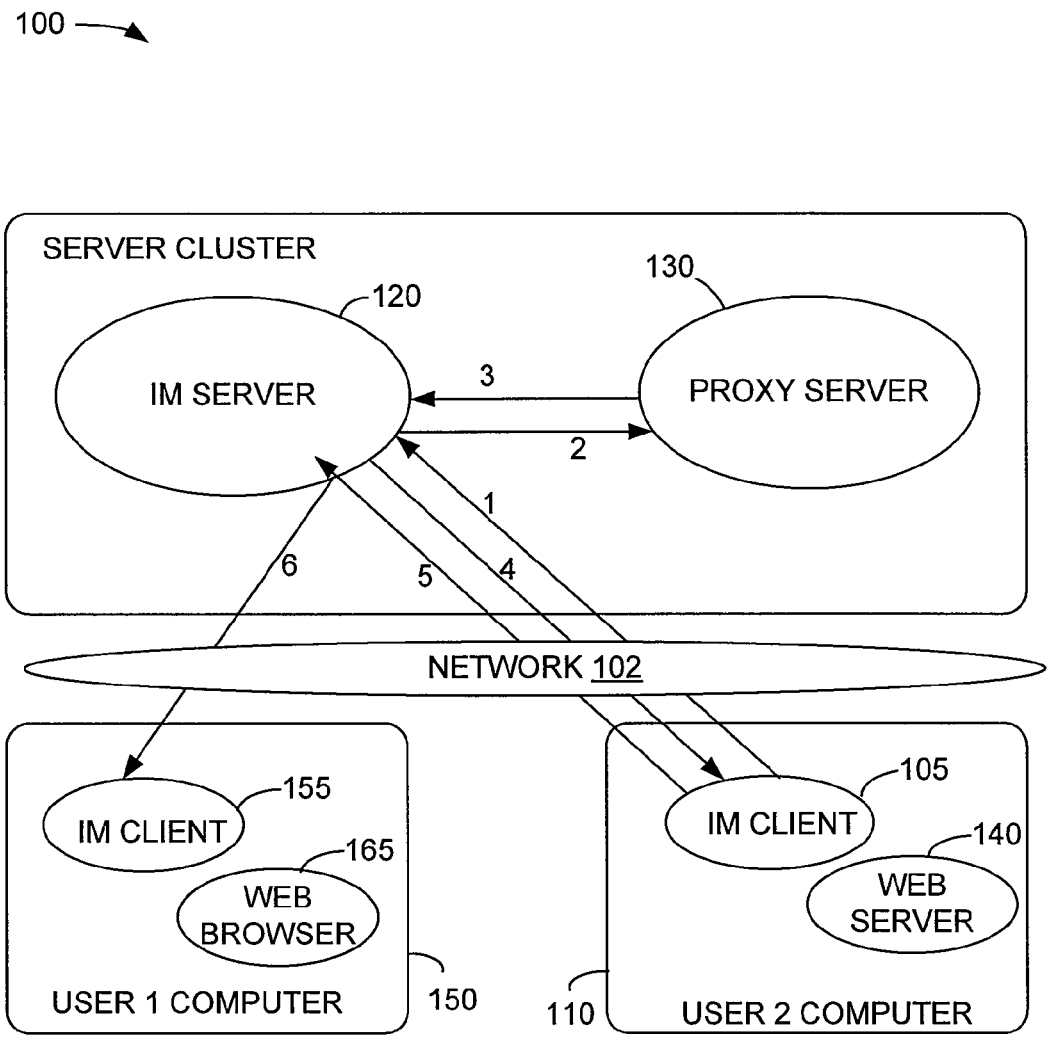
FIG. 1 is a block diagram of one embodiment of a distributed web publishing system of the present disclosure.

Referring to FIG. 1, one embodiment of a distributed web publishing system 100 is shown. Consider a scenario where a user ("User 2") has content that he or she would like to publish to another user ("User 1"). Via an instant messaging application ("IM Client") 105 on User 2's computer ("User 2 Computer") 110, User 2 requests (1) a uniform resource locator (URL) from an instant messaging server ("IM Server") 120 over communication network 102. In one embodiment, the communication network 102 is a network of communication links that are arranged such that communication messages may be passed from one part of the network to another (using gateways such as a wireless data gateway, for example). Accordingly, one part of the communication network 102 may employ a different transmission system and/or communication protocols than another part. Further, more than one type of communication message may be transmitted from one part of the communication network 102 to another part. The communications network 102, in one embodiment, may be the Internet. Otherwise, the communications network, in one embodiment, may be an intranet network. An intranet is restricted and while it may follow the Internet protocol, none or only part of the network may be accessible from the Internet.

The URL will be used to publish content to other user(s) from User 2 Computer 110 that is not located on the Internet. The IM Server 120 forwards (2) the request onto a Proxy Server 130, as shown in the figure. The Proxy Server 130 forms (3) and returns the URL to the IM Server 120. The IM Server 120 returns (4) the URL to an IM Client 105 on the User 2 Computer 110. The IM Client 105 now has a URL that has been assigned by the Proxy Server 130.

The URL that is created by the Proxy Server 130 contains direction on how to correspond with the Proxy Server 130 but also contains information as to the identification of the IM Client 105 that requested the URL. This is all built into the URL.

In addition, the IM Client 105 can add onto (append to the end of) the URL with additional services, such as photo, folder sharing, etc. So, the IM client 105 is provided a base URL that may be enhanced by the IM Client 105. In some embodiments, a service name is provided when the initial request for the URL is made. The URL may then be enhanced with identifications of sub-folders, files, etc. In some embodiments, the service name generally translates to a folder or file contained on the User 2 Computer 110.

The User 2 Computer 110 may be referred as a publisher, since the computer is used to publish content onto the Internet. The base URL provided by the IM service may be modified by the publisher, as previously suggested. Generally, the IM service provides a path to the User 2 Computer 110 or publisher, where the publisher provides additional and more specific information for locating content that is being published. This information may include directory information (e.g., local root directory) and the names of the files being published.

In some embodiments, the URL contains within it an instant messaging identifier or username. Therefore, in some embodiments, a URL provided by the Proxy Server 130 may contain information identifying a host and Internet protocol address; instant messaging username of person that is offering service and made the request; name of service they are offering, etc.

Next, the URL is published (5) to other user(s). User 2 can publish the URL in a number of different ways. One way is to publish a URL in presence information. For example, instant messaging services often have a built in message that follow a PubSub (publish subscribe) model. Therefore, after the URL is published with presence information, anyone who subscribes to a user's presence also receives the URL information. In one embodiment, the URL information is stored on the IM Server 120, after it is published, so that it shows up automatically whenever anyone requests the user's presence, as long as the user is "present" and until the user requests for it to be withdrawn.

For example, in one embodiment, an IM client 155 of a user may be configured to indicate when other users have files that have been published and are available for sharing. Therefore, an IM client 155 may show an indicator icon next to a buddy icon of User 2 to indicate that User 2 has chosen to publish a URL. Accordingly, a user may select the indicator icon (e.g., clicking on the icon) which may cause the user's Web Browser 165 to display the contents or links to the contents associated with the URL. Therefore, a "buddy list" displayed by an IM client 155 may not only indicate whether another user is available or not, does not want to be disturbed, etc., but whether there are applications or files that the other user wishes to share, such as photo sharing. Note, that any type of application or file can be made available via the URL, including web pages in HTML format.

Other ways to publish a URL includes directly inviting someone (e.g., someone who uses a different style of instant messaging service) by sending the person the URL in a chat message. One could also email someone the URL. Further, one could publish the URL information in a directory that people subscribe to, such as RSS feeds.

Therefore, User 2 could have gigabytes of files on the local hard drive of User 2 Computer 110 and he or she can publish them and notify the world of their availability to be shared, but not one byte of the files have left the User 2 Computer 110. This is in direct contrast with general web hosting practices where a user has to upload files up to a server on the Internet. Here, in the system of FIG. 1, all the files are accessible off of User 2 Computer 110, and there is no server side storage.

Figure 2:
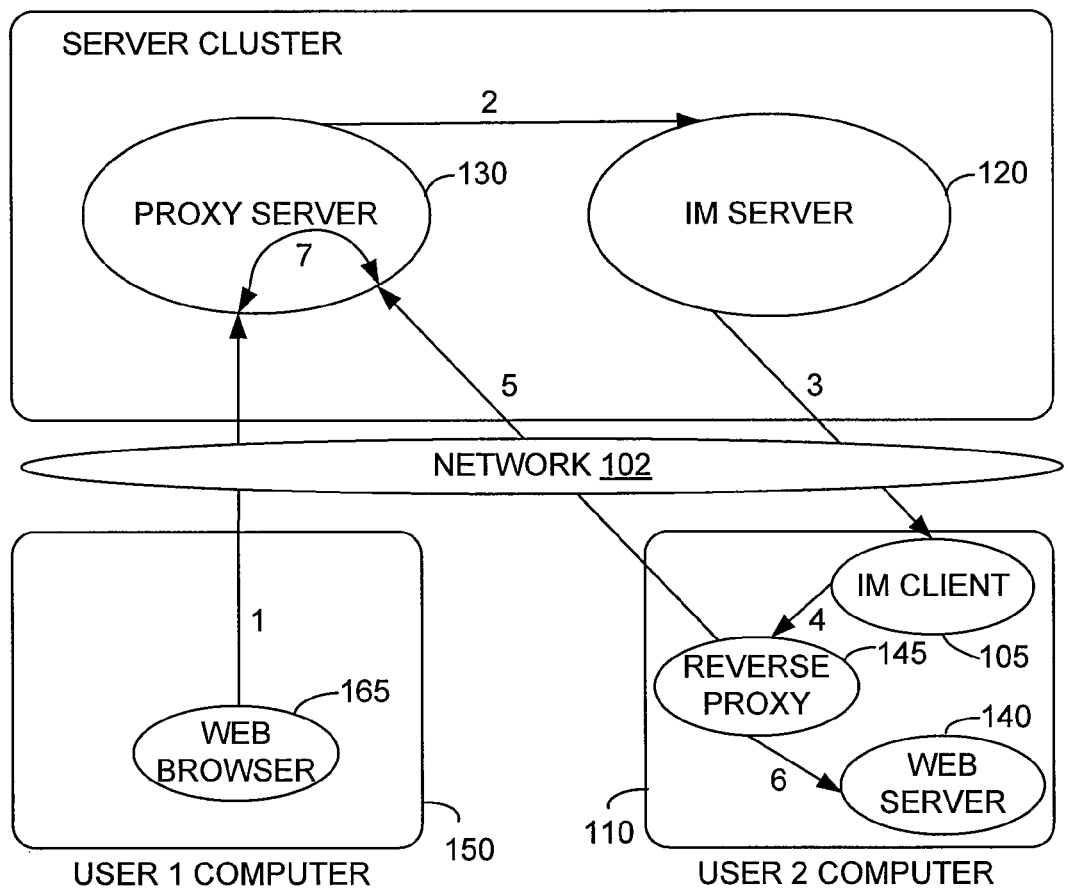
FIG. 2 is a diagram of an exemplary process for serving content in accordance with an embodiment of the system of FIG. 1.

Referring now to FIG. 2, a process for serving content identified by the URL is described. For example, after "clicking" on a published URL, the application used to access the URL, such as an e-mail application, IM application, Web Browser 165, etc.) may launch a Web Browser 165 (if one is not currently opened) so that the Web Browser 165 may retrieve (1) (via a HTTP GET request) content identified by the URL. Note, the URL contains the IP address of the Proxy Server 130 (from FIG. 1). Therefore, the Web Browser has translated the URL into a HTTP GET request that is made (1) to the Proxy Server 130 from the Web Browser 165 installed on a computer 150 of User 1. This opens a socket connection to the Proxy Server 130.

The Proxy Server 130 reads in the GET request and parses the URL to determine who in the IM service is the target of the request. The Proxy Server 130 has a persistent connection with IM Server 120 and may exist as a component of the IM service.

The URL information also contains information regarding IM services of the user who originally requested the URL. Therefore, the Proxy Server 130 sends a request (2) to the IM Server 120 to access the content associated with the URL. This may be referred as a request for a reverse proxy. The request is forwarded (3) from the IM Server 120 to the IM Client 105 of User 2. In other words, the IM Server 120 informs the IM Client 105 of a service request (e.g., a pending GET request for a particular file). In an additional step, the IM Client 105 of User 2 is requested to authorize fulfillment of the service request. For example, User 2 may be asked to provide permission before files on User 2 Computer 110 are allowed to be shared. During this time, the connection is on hold between the web browser 165 of User 1 and the Proxy Server 130.

In the request for the reverse proxy, the Internet Protocol address and port number of the Proxy Server 130 are provided. A Reverse Proxy module 145 on User 2 Computer 110 (which may be part of an IM Client application) is launched (4) and attempts to initiate (5) a connection with the Proxy Server 130. Further, a Web Server module 140 is launched (6) on the User 2 Computer 110 that is used to serve the files stored on the User 2 Computer 110. Once the connections are open through both the Proxy Server 130 and the Reverse Proxy 145, a path is completed from the web browser 165 of User 1 to the Proxy Server 130 back down to the User 2 Computer 110 through the Reverse Proxy 145 to the Web Server 120.

With the Web Browser 165 of User 1 having a direct connection with the Web Server 140, a standard HTTP transaction occurs. Accordingly, the Web Server 140 reads the GET request that has been pending and matches the GET request with the appropriate HTTP response (e.g., sending the file that is requested (5)). The connection from the Web Browser 165 that was put on hold earlier (2) is basically connected as a pass through to the Web Server 140 (7). There are a variety of ways of doing this.

For example, each connection may have its own port and the Proxy Server 130 would know by the port that is being used to connect to the Proxy Server 130 which connection on route 1 to patch it to.

Another way involves when the Reverse Proxy 145 opens a connection (5), the Proxy Server 130 determines the appropriate connection from route 1 by comparing data between the original connection and the connection from the Reverse Proxy 145. The original GET request is then sent (5) to the Web Server 140.

Once a connection is made, the Web Server 140 reads the GET request and responds through the flow through the Reverse Proxy 145 and Proxy Server 130 and serves up the necessary file which goes straight over to User 1 Computer 150.

Another way to make the necessary connections between the User 2 Computer 110 and the User 1 Computer 150 is to consider a web proxy server. For example, making a regular socket connection from the Reverse Proxy 145 to the Proxy Server 130 is not compliant with some security or network measures that require connections to be made via a web proxy server. Generally, a web proxy server prevents a computer from making direct connections to an external network 102, such as the Internet. The web proxy server is used to make the connection to the network 102 and filters content for the computer.

For example, consider that a GET request is received (1) by a Proxy Server 130 from a Web Browser 165. In this variation, a preview of the GET request is then packaged in a message that is sent (2) to the Reverse Proxy 145. The message may also contain the hostname and port of the Proxy Server 130 as well as the requested URL and the identification information of requesting user. The connection between the Web Browser 165 and the Proxy Server 130 is held open waiting a reply on a new connection.

The message is sent through the IM Server 120 (3) and the IM Client 105 (4) to the Reverse Proxy 145. The Reverse Proxy 145 feeds (6) the GET command to the Web Server 140 and the Web Server 140 processes the command. Then, a reverse connection is made from the Reverse Proxy 145 to the waiting Proxy Server 130 (5), which still holds a connection (7) with the Web Browser 165 of User 1. In making the replying connection, the Reverse Proxy Server 145 uses an HTTP PUT command which a web proxy server generally finds as a valid transaction. Additional information is added to the header of the HTTP command so that the Proxy Server 130 knows where the command came from and where it is intended to be delivered. The Proxy Server 130 is still holding onto the original GET request, so when the PUT command is received, the Proxy Server 130 flushes the GET request. Further, the Proxy Server 130 strips the header information from the PUT command and delivers remaining information to the Web Browser 165 as a standard response to a GET request. This approach is faster than some of the previous approaches discussed above. As also discussed, this approach may work in environments with restrictive network policies, such as corporate networks.

One advantage of the systems and methods of the present disclosure is that custom web browsing software is not required for a user viewing published content, unlike other peer to peer file-sharing programs. Further, embodiments of the distributed web publishing system 100 of the present disclosure provides peer to peer web hosting that is accessible and manageable by persons who do not know how to configure, install, and operate a standard web server. With embodiments of the present disclosure, users can post web content on a local computer and have it appear to others as being hosted at a web facility when it is not. This allows a home user to provide web services from his or her home to the home of his buddies without finding a web hosting service to do it for him or her or without having to upload files up to a central file server for distribution purposes. Also, with the techniques of the present disclosure, a user avoids paying for the costs of web hosting services and being limited to storage limitations imposed by the web hosting service. For example, a user could publish the content of his or her music folder immediately to his or her friends. Accordingly, friends can promptly view icons (or other representations) of the content on their computers that can be downloaded to the friend's computers on demand. However, none of the content has actually been transferred from the user's computer. The content only leaves the computer on demand from another (such as a friend). In this way, a large amount of data is not being transferred to a central server when there may be no or little demand to access that data. In one sense, embodiments of the present disclosure are a type of distributed web hosting, where web hosting is being done at the edges of distribution.

Embodiments of the Web Server 140 hosted on a user's own computer support standard HTTP methods, such as PUT, GET, POST, etc. To facilitate user interactions, Flash applications, applets, etc. in some embodiments, are deployed by the Web Server 140 and executed by a user's Web Browser 165 when interacting with the Web Server 140. Further, a wide variety of sharing utilizations may be incorporated by tools and applications of the distributed web publishing system 100.

Figure 3:
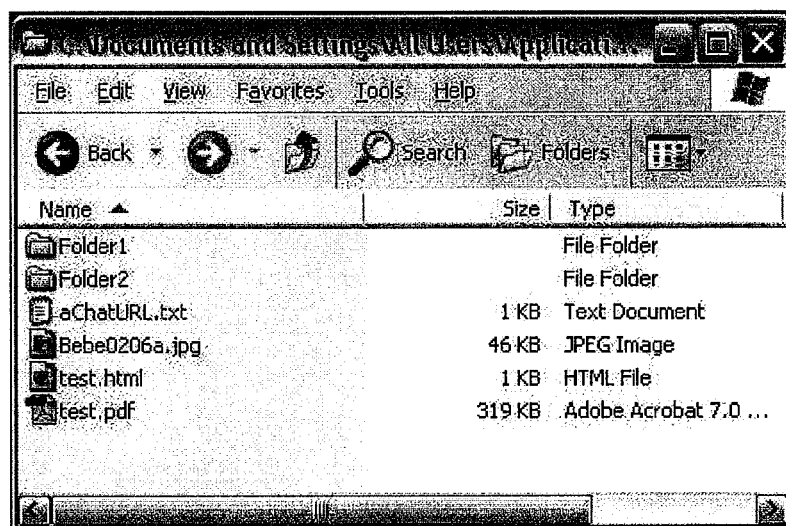
FIG. 3 is a diagram of an exemplary directory on a local computer used for file-sharing in one use of an embodiment of the system of FIG. 1.
Figure 4:
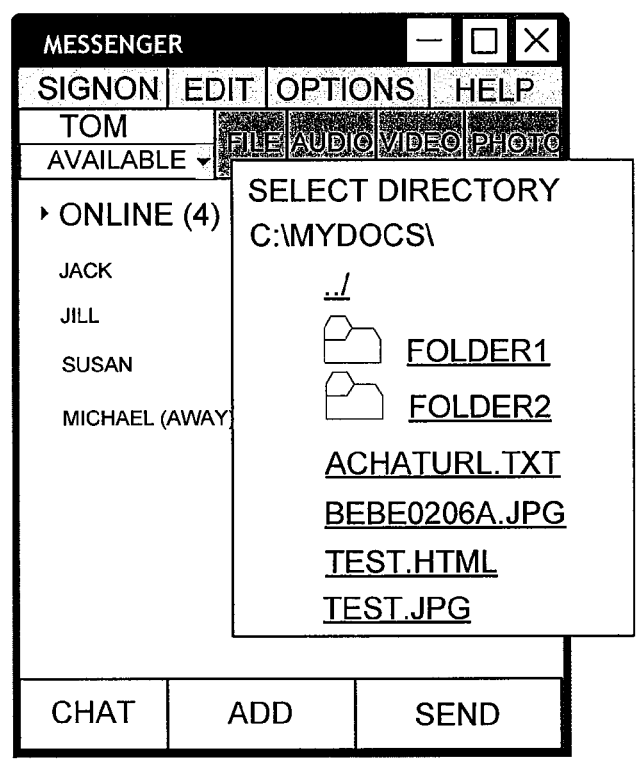
FIG. 4 is a diagram of an exemplary instant messaging application being used to specify a location of a folder for file-sharing in one use of an embodiment of the system of FIG. 1.
Figure 5:
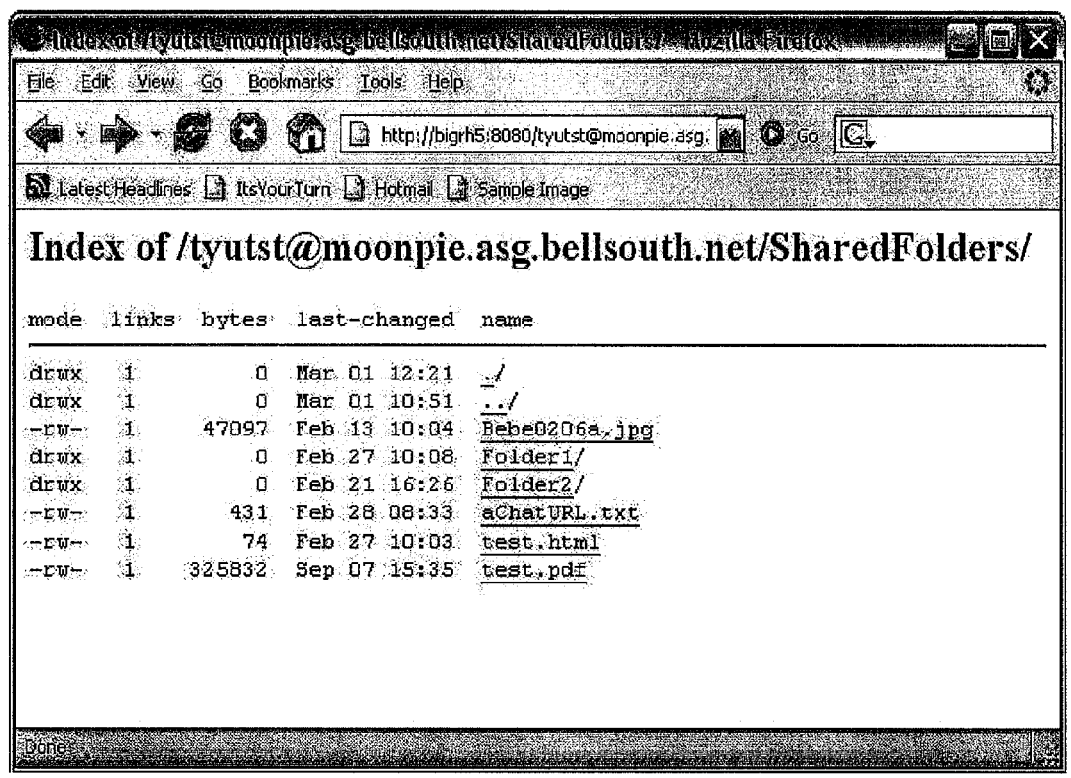
FIG. 5 is a diagram of one embodiment of a web browser displaying an index page for the folder identified in FIG. 4.

One such use is file sharing. For example, a user of the system 100 may place a number of files in a folder or directory on his or her computer 110, as shown in FIG. 3. An application, such as an instant messaging application or client 105, may include a mechanism that allows the user to specify or indicate the location of the folder on the computer system 110, as shown in FIG. 4. The application also allows the user to indicate a willingness to publish the contents of the folder to everyone on his or her contact list (e.g., a Buddy List) or to individual users. The application 105 sends a request to the IM server 120 for a URL that will direct others to the user's computer 110. The application 105 adds additional information to the URL that will direct others to the particular folder identified by the user. This enhanced URL is then passed to other users (e.g., users identified from contact list). Other users may click on the URL via their web browsers 165 and retrieve an index page generated by the Web Server 140 showing the content of the folder identified in the URL, as shown in FIG. 5. Further, in some embodiments, a Flash application may be automatically launched from the server 140 that provides a file sharing tool for viewing and downloading files from the folder being published. Further, in some embodiments, an additional capability may allow other users viewing the published content to upload content of their own to the folder using a PUT method command. In this way, a user could access a home computer while at work and copy files to and from the home computer while at work. This allows publishing on both ends of the distribution path.

Embodiments of the present disclosure provide unique user experience with a very low cost per user architecture. In one embodiment, this is achieved by combining rich, centrally served, Flash web applications with end user hosted data. End user hosted data may include video streams that flow from endpoint to endpoint e.g., from camera to video player, where none of the video data is ever stored or later retrieved from a central server. Economy is achieved by transferring data from end user to end user, from edge to edge, in a peer to peer fashion. No central storage space is required regardless of how much media users care to share.

Another use of the present system is photo sharing. In one embodiment, a photo album viewer web application is served from the Web Server 140 (e.g., a Flash application that runs in a web browser 165 and enables display and browsing of image files) or is integrated with an IM application 155. The Web Server 140 sends an XML stream of photo and photo thumbnail from one end of the distribution to the other, where a URL provided by the IM Server 120 directs users to the computer 110 hosting the Web Server 140. The photo viewer web application intercepts and interprets this XML stream and can then request the appropriate thumbnail or photo as needed. Users can share their photos in this manner with no central storage overhead cost. Unlike other photo sharing applications, this embodiment does not require publisher and subscriber (viewer) side software. A user (e.g., subscriber/viewer) viewing published content can utilize a conventional web browser 165 since the shared content is provided by a Web Server 140.

Figure 6:
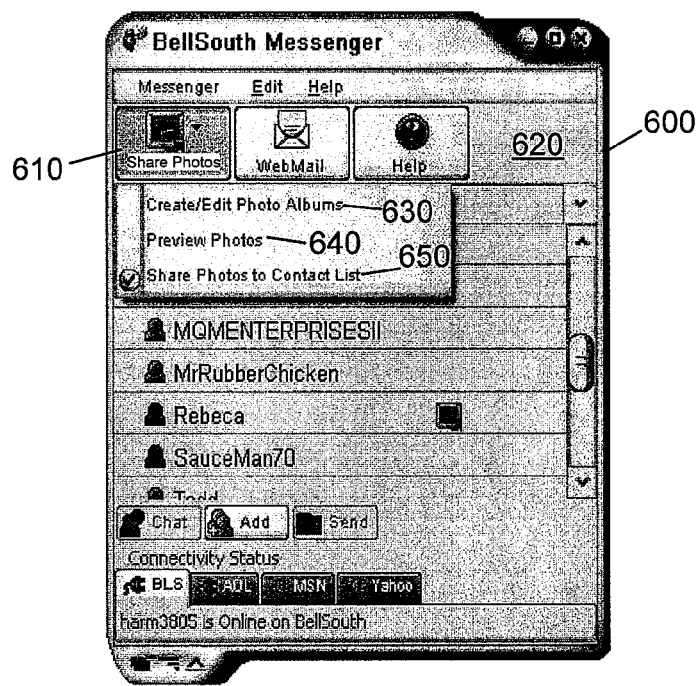
FIGS. 6-9 are diagrams of one embodiment of instant messaging interfaces for creating a photo album for publishing.
Figure 7:
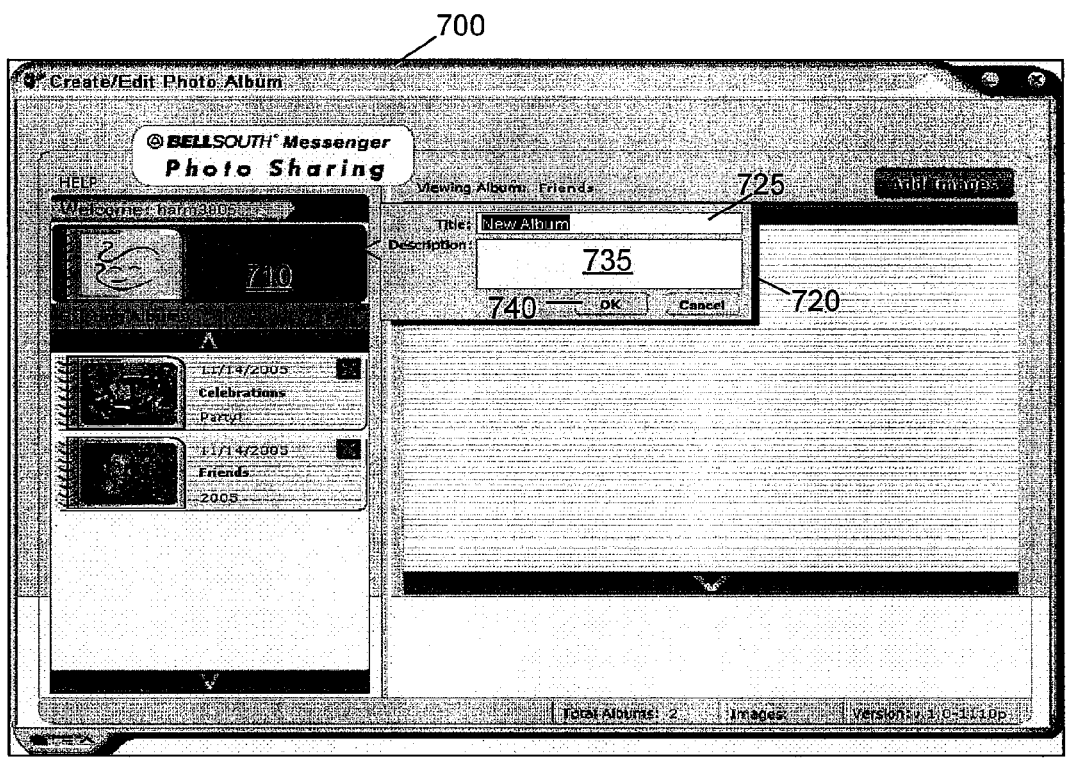
Figure 8A:
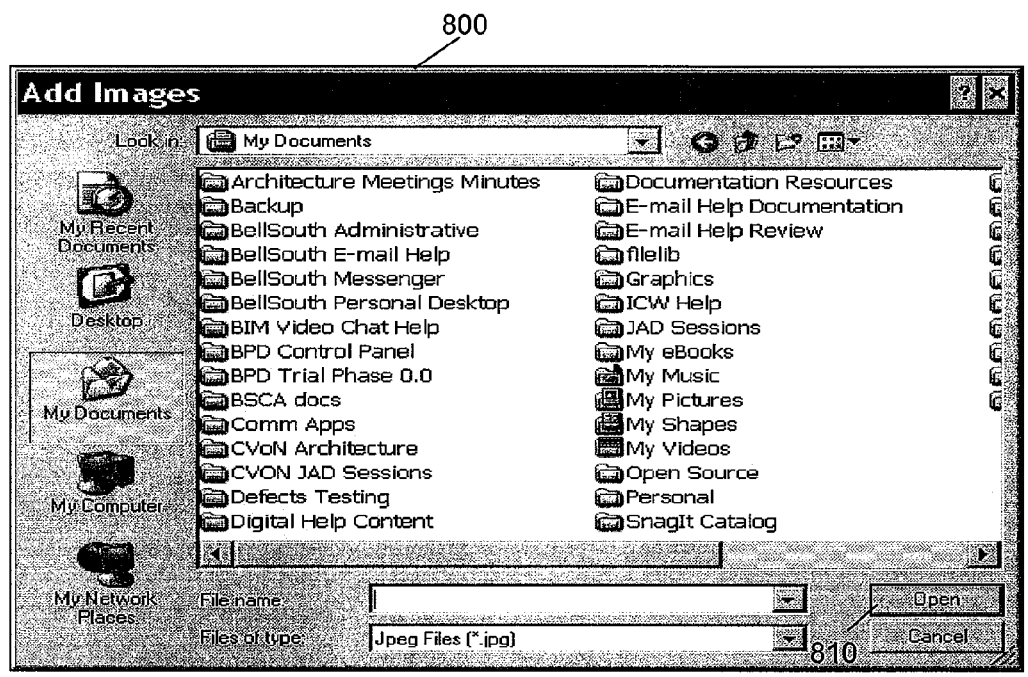
Figure 8B:
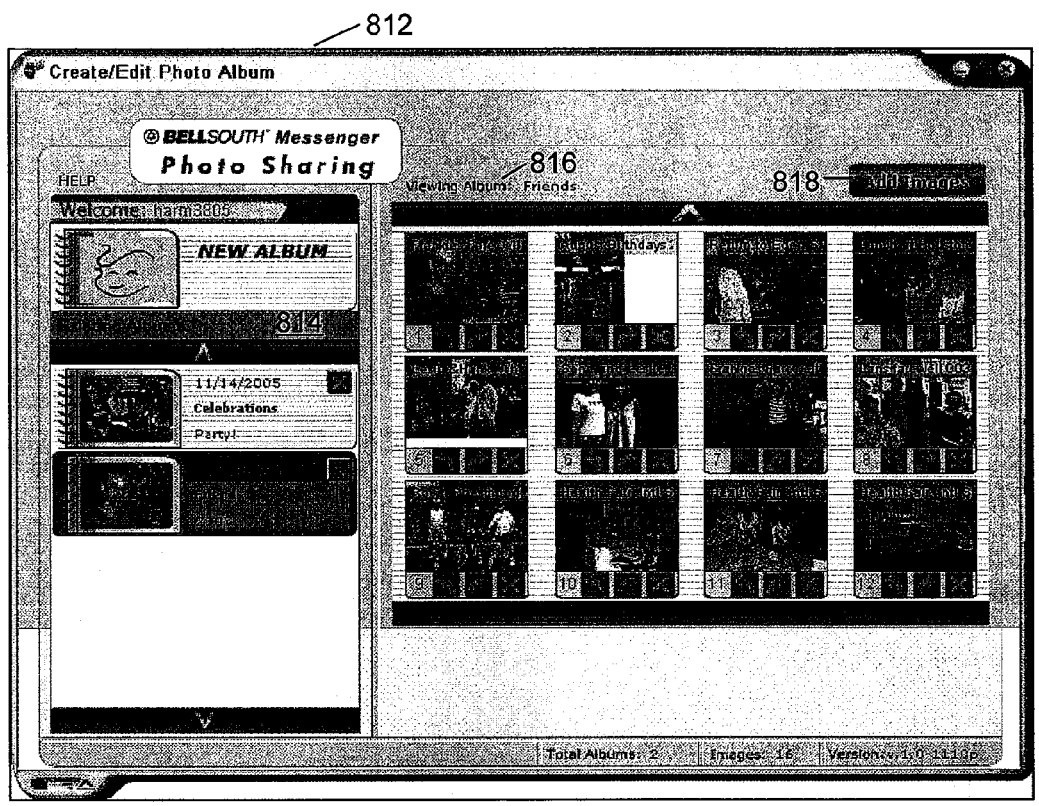

In one embodiment, an IM application 155 ("Messenger") provides an interface for creating a photo album for publishing. FIG. 6 shows one embodiment of a Messenger interface 600 for creating a photo album for publishing. Accordingly, to create a photo album, in a Messenger window, a Share Photos button 610 is clicked on the toolbar 620, and then Create/Edit Photo Albums menu option 630 is selected. A Create/Edit Photo Album window 700 appears, as shown in FIG. 7. Under Welcome, New Album option 710 is clicked. A Title/Description box 720 appears. In the Title box 725, a title for the new photo album (maximum length is 30 characters) can be typed by the user. In the Description box 735, a description for the photo album (maximum length is 30 characters) is typed by the user. The user can then click OK 740 which causes an Add Images dialog box 800 to appear, as shown in FIG. 8A. The user navigates to the folder where the photo images are located that are to be published. The user selects the file(s) that are desired and clicks Open 810. Then, the selected photo image(s) appears in the photo album. Note: To select multiple images, the user can hold the CTRL or SHIFT key on their computer keyboard while selecting the desired images.

Additional features and services may be offered by the photo album interface 600, such as editing existing albums by adding and deleting images or changing the titles and narratives as well as rotate the position of a photo image in the album. Accordingly, to add photo images to an existing photo album, in the Messenger window 600 of FIG. 6, click the Share Photos button 610 on the toolbar 620, and then the user can select Create/Edit Photo Albums menu option 630. The Create/Edit Photo Album window 812 appears, as illustrated in FIG. 8A. Under Existing Albums 814, the user can select a photo album. The photo images in that album are shown under Viewing Album 816. If the user clicks Add Images 818 to add more photo images to the photo album, the Add Images dialog box appears 800, as illustrated in FIG. 8A. The user may also navigate to the folder where the photo images are located and select the file(s) to be added. By clicking Open 810, the selected photo image(s) appear in the photo album. Note: To select multiple images, the user can hold the CTRL or Shift key on their computer keyboard while selecting the desired images.

Figure 8C:
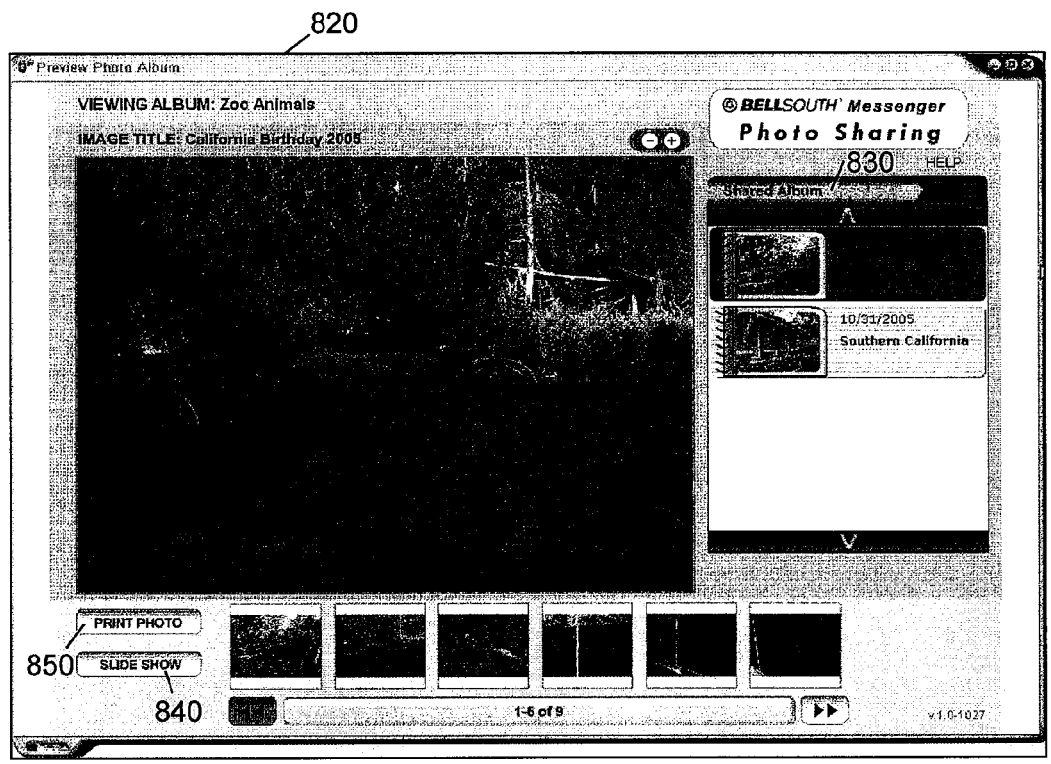

As illustrated, one embodiment of the Messenger photo viewer provides peer-to-peer sharing of the photo images in a user's photo album. The photo viewer can be accessed from the Share Photos menu 610 or by selecting a photo sharing presence icon in the user's contact list. A user may also print photo images from the photo viewer. To preview a photo album, a user can click the Share Photos button 610 on the toolbar 620 of the Messenger window 600, and then select Preview Photos menu option 640. A Preview Photo Album window 820 appears, as shown in FIG. 8C. The preview option is useful in providing the publisher an opportunity to view images, as they will appear to a person who accesses the images for viewing. Under Shared Album 830, the user can select the photo album he or she would like to view. The user may then do one of the following: select a photo from the thumbnail area to view, click Slide Show option 840 to view the photo album as a slide show, or click Print Photo option 850 to print a photo image.

Sharing photo images is easy with embodiments of the Messenger interface illustrated in the preceding figures. In one embodiment, images may be shared by making them available to a user's entire contact list or from the Invite menu in a Chat Session window, as illustrated below. The shared images are available to others while the user is signed in to his or her IM service, although the user does not need to be active or available on the service. A photo sharing presence icon appears next to the publisher's name in other's contact lists when the user shares photo images. Other contacts can view the user's photo images when they click the photo sharing presence icon.

Figure 9:
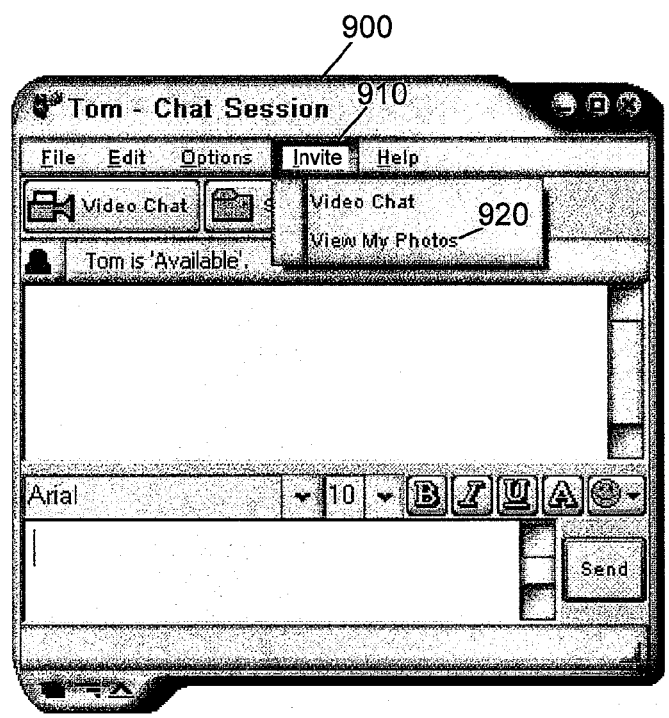
Figure 10:
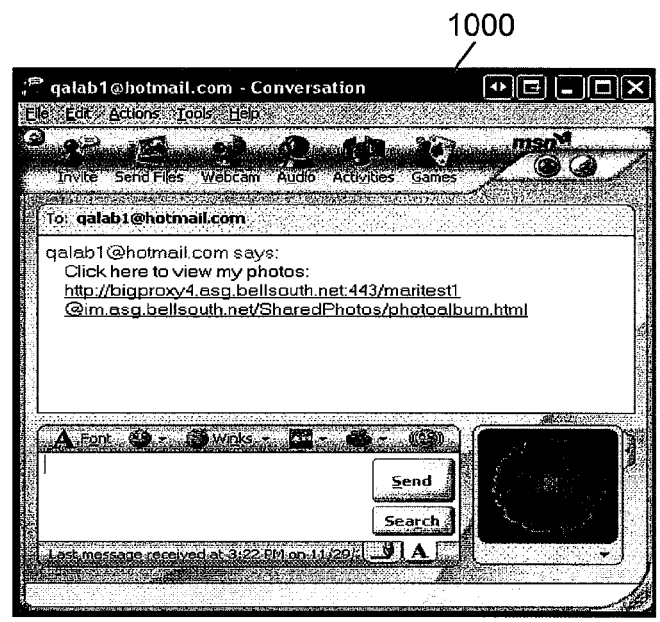
FIG. 10 is a diagram of an embodiment of a chat session window of a recipient of invitation for photo sharing in accordance with the system of FIG. 1.

In one embodiment, to share photo images in the Messenger window 600, a user can click the Share Photos button 610 on the toolbar 620, and then click Share Photos to Contact List option 650, as illustrated in FIG. 6. The photo images are then made available to the user's contacts in his/her contact list. To share photo images from a Chat Session window 900, in one embodiment, a user can first open a Chat Session window, as illustrated in FIG. 9. On an Invite menu 910, the user can click View My Photos 920. This causes the prepared URL to be sent to everyone on the user's contact list in a chat message. The message 'Photo Share Invitation Has Been Sent' (not shown) will then appear in the Chat Session window 900. An illustration of a chat session window 1000 of a recipient of the "Photo Share Invitation" is shown in FIG. 10. Alternatively, the capability to invite contacts in the list that are on transports other than the user's IM service or to invite users not on the contact list to view published content is also provided.

Note, in a conventional web hosting environment, it is expected that a URL will be available all the time since web hosting facilities are generally always in operation. However, with a personal computer, it should not be expected that the personal computer will be in constant operation. Therefore, a URL provided by embodiments of the present disclosure will sometimes not be accessible. Accordingly, by imbedding URL information in presence notifications, the presence notifications make edge based media sharing more advantageous, in some embodiments.

When a media sharing presence icon is on or displayed within a contact list or address book, published media is indicated to be available and may be accessed by clicking on the presence icon (by positioning a cursor over the icon and clicking a mouse control for example). When the media is not available, the media sharing presence icon is not displayed. The URL is thus hidden and exposed by presence.

Figure 11:
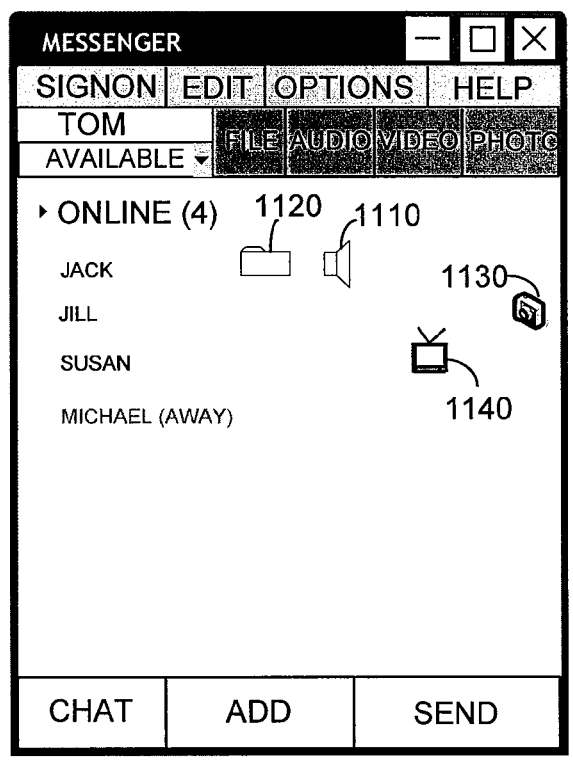
FIG. 11 is a diagram of an exemplary interface to a contact list containing media sharing presence icons in accordance with an embodiment of the system of FIG. 1.

In FIG. 11, media sharing presence icons are displayed that represent music or audio 1110, file 1120, photo 1130, and video sharing 1140. In other embodiments, other icons and media types may be features. The examples in the figure are merely illustrative of one example of many. The media sharing presence icons shown by each name in the contact list indicate that the media is being shared or published by that contact or friend. In other words the sharing itself has presence. If a media sharing icon is grayed, then that media is not available. In the example shown, Jack is presently sharing files and audio, while Susan and Jill are sharing video and photos respectively.

Because the media sharing uses IM presence, an IM presence enabled address book (not shown) or IM application could show shared media presence icons and launch the shared media programs as well. A friend could be showing an "away" or "do not disturb" state or presence yet the photo or music sharing icons could show this media as available. In accordance with the presence disclosure, presence is associated with web services so that others can determine whether the service is currently available based on presence notifications. It is noted that presence is just one potential vehicle for distributing URL information. Other vehicles include e-mail, instant messaging, RSS feeds, etc.

Embodiments of the present disclosure provide a unique interactive environment for file sharing. For example, if a user publishing content is available, the user can chat about what he or she has published with users viewing the content. For example, users can strike up a video conversation or a voice conversation over their respective computers. In this way, photo sharing becomes more fun (or other types of media sharing) since it is in real time and is collaborative. Immediate feedback is able to be provided as soon as pictures are published.

Consider the following sample session. A user, Jill, wants to share some media files. Jill logs on to her IM service via her IM application (Messenger). Via her instant messaging application, Jill selects the photo album containing her recent vacation photos and tells the system to share or publish the music file to users on his contact list. A little photo album icon then displays on other person's contact lists next to Jill's name.

Figure 12:
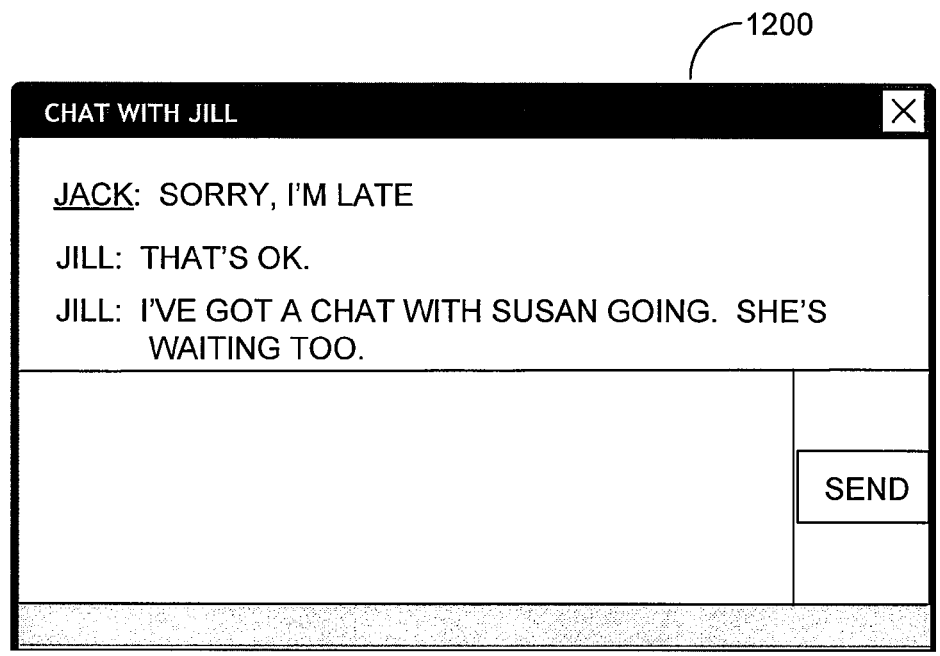
FIG. 12 is a diagram of an embodiment of a chat window utilized in an embodiment of the system of FIG. 1.
Figure 13:
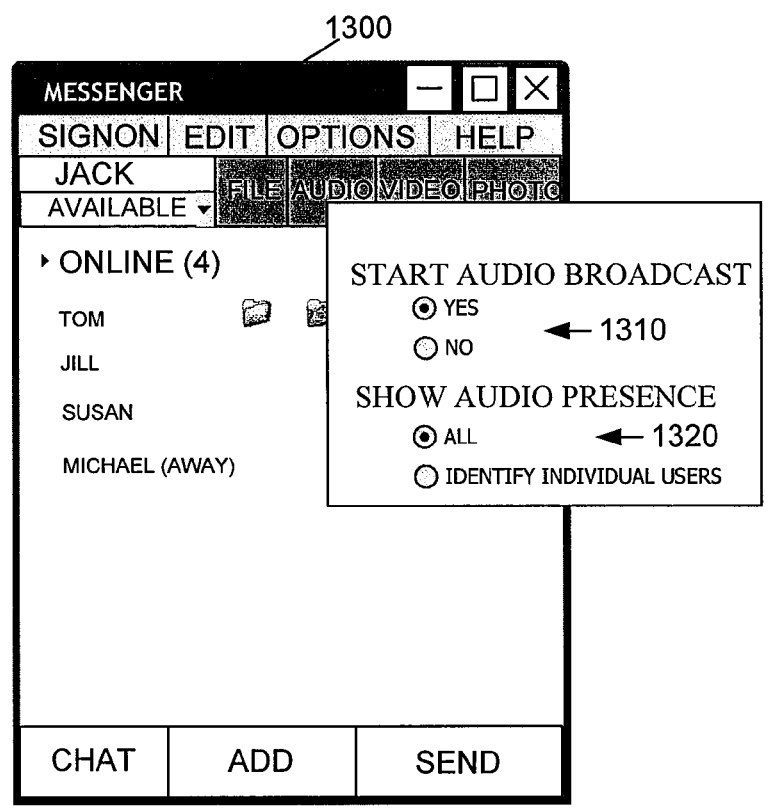
FIG. 13 is a diagram of an exemplary interface to an instant messaging application configured to share an audio broadcast in accordance with the system of FIG. 1.

Jack is a user on Jill's contact list. He gets home and logs into his IM service via his IM application (Messenger). Jack can see that Jill has an active presence in his contact list or roster. A photo album icon next to her name tells him she has published her vacation photos. "Sorry, I'm late" he types in his Messenger chat window 1200, as illustrated in FIG. 12. "That's ok," Jill replies. "I've got a chat with Susan going, she's waiting too." Jack selects to activate the "Start Audio Broadcast" option 1310 on his Messenger window 1300, as shown in FIG. 13, and sets the "Show Audio Presence" list to "All" 1320. He then clicks on a carefully crafted playlist in the dialog box that pops up (not shown). The media player (not shown) starts, a hip hop beat fills the room, and a broadcasting icon slowly blinks off and on.

On Jill's computer, Jack's presence suddenly turns green indicating he's available. A chat session from Jack pops-up. Jill replies. Next, a music broadcasting or audio icon 1110 appears next to Jack's name in the contact list. Jack's broadcast has begun. Jill clicks on the icon 1110. Her media player starts, and a hip-hop beat fills the room. "Wow, that sounds great," Susan chats. She's listening, too. A video sharing presence icon 1130 appears by Susan's name in Jill's contact list. Now, Susan is broadcasting video, Jill muses. Probably wants to chat about Sam. Hope she set her "Show Video Presence" to just me (as provided in the video menu option on the Messenger window 1300).

Any type of file may be distributed using embodiments of the present disclosure. For example, web pages (e.g., HTML pages) may also be distributed. All a user has to do is place the page on his or her computer, have a URL created pointing to the page on the user's computer, and then serve the page using the IM delivery approach of the present disclosure.

Figure 14:
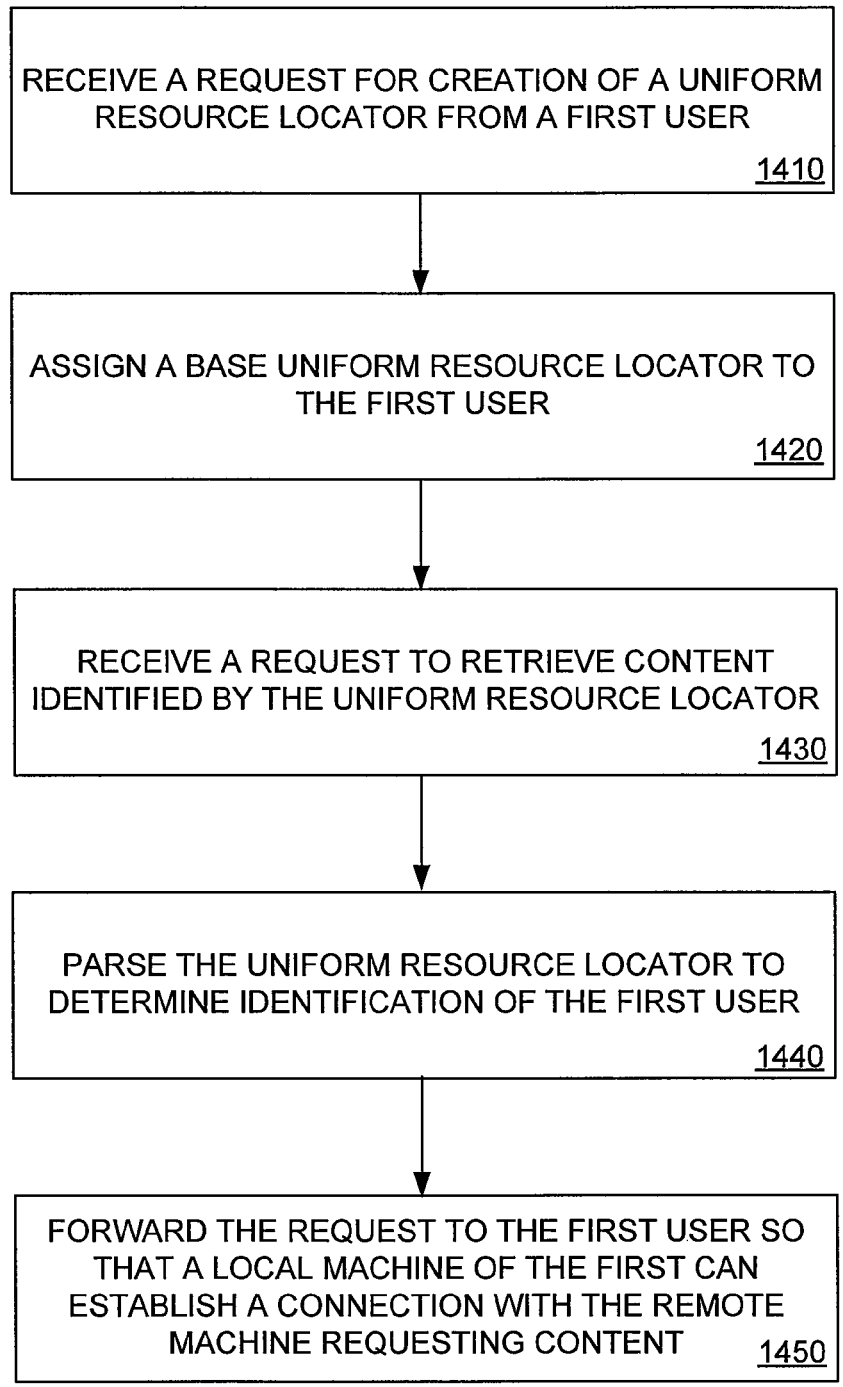
FIGS. 14-15 are embodiments of methods for publishing content over a network in accordance with the system of FIG. 1.

Referring now to FIG. 14, one embodiment of a method for publishing content on a network is described. The method includes the step of receiving (1410) a request for creation of a uniform resource locator from a first user. In response, a base uniform resource locator is assigned (1420) to the first user. The method further includes the step of receiving (1430) a request to retrieve content identified by the uniform resource locator. In response, the uniform resource locator is parsed (1440) to determine identification of the first user. The request is then forwarded (1450) to the first user so that local machine of the first user can establish a connection with a remote machine requesting the content.

Figure 15:
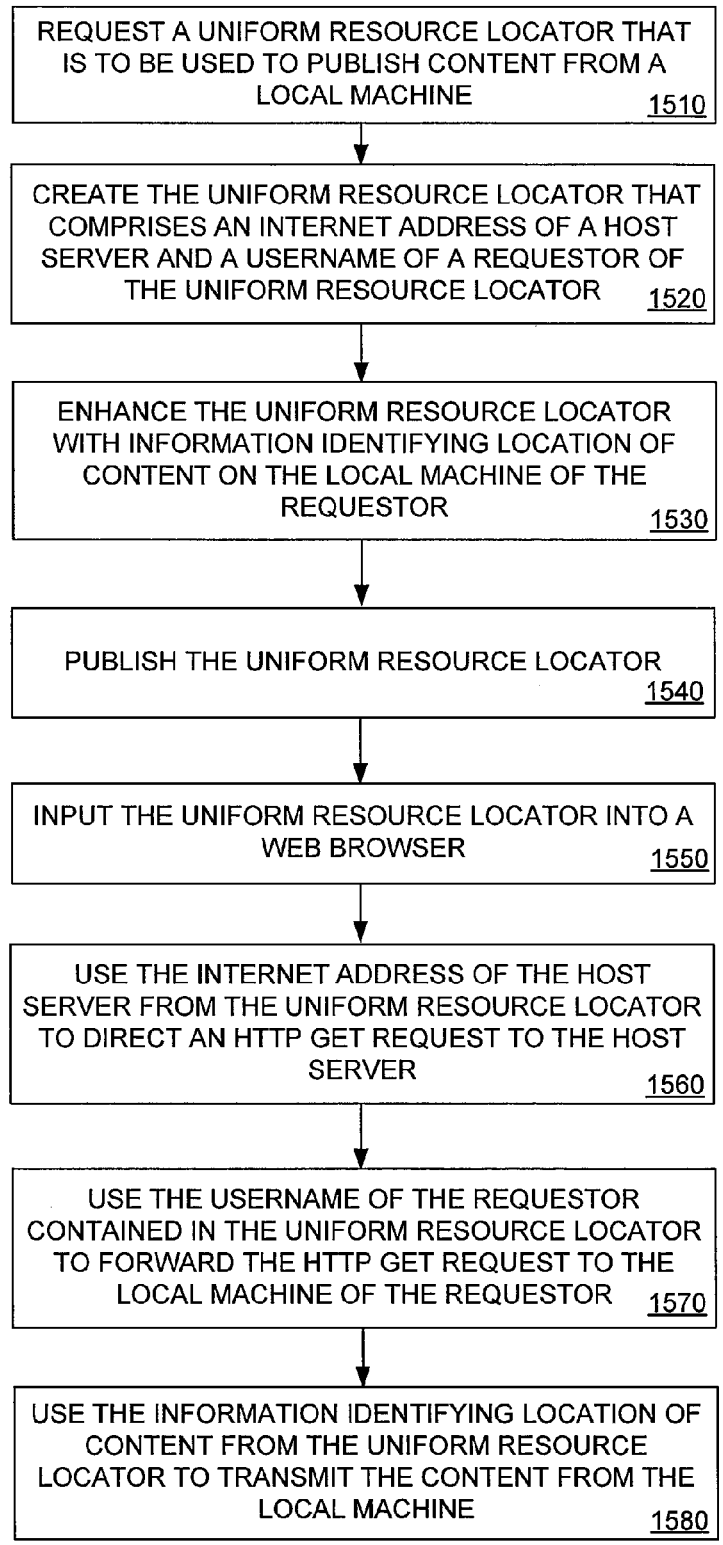

Referring now to FIG. 15, another embodiment of a method for publishing content on a network is described. The method includes the step of requesting (1510) a uniform resource locator that is to be used to publish content from a local machine. The uniform resource locator is created (1520) and comprises an Internet address of a host server and a username of a requester of the uniform resource locator. The uniform resource locator is enhanced (1530) with information identifying location of content on the local machine of the requester and then published (1540). Another user inputs (1550) the uniform resource locator into a web browser. The web browser uses (1560) the Internet address of the host server from the uniform resource locator to direct an HTTP GET request to the host server. The host server uses (1570) the username of the requestor contained in the uniform resource locator to forward the HTTP GET request to the local machine of the requester. The local machine of the requestor uses (1580) the information identifying location of content from the uniform resource locator to transmit the content from the local machine.

Figure 16:
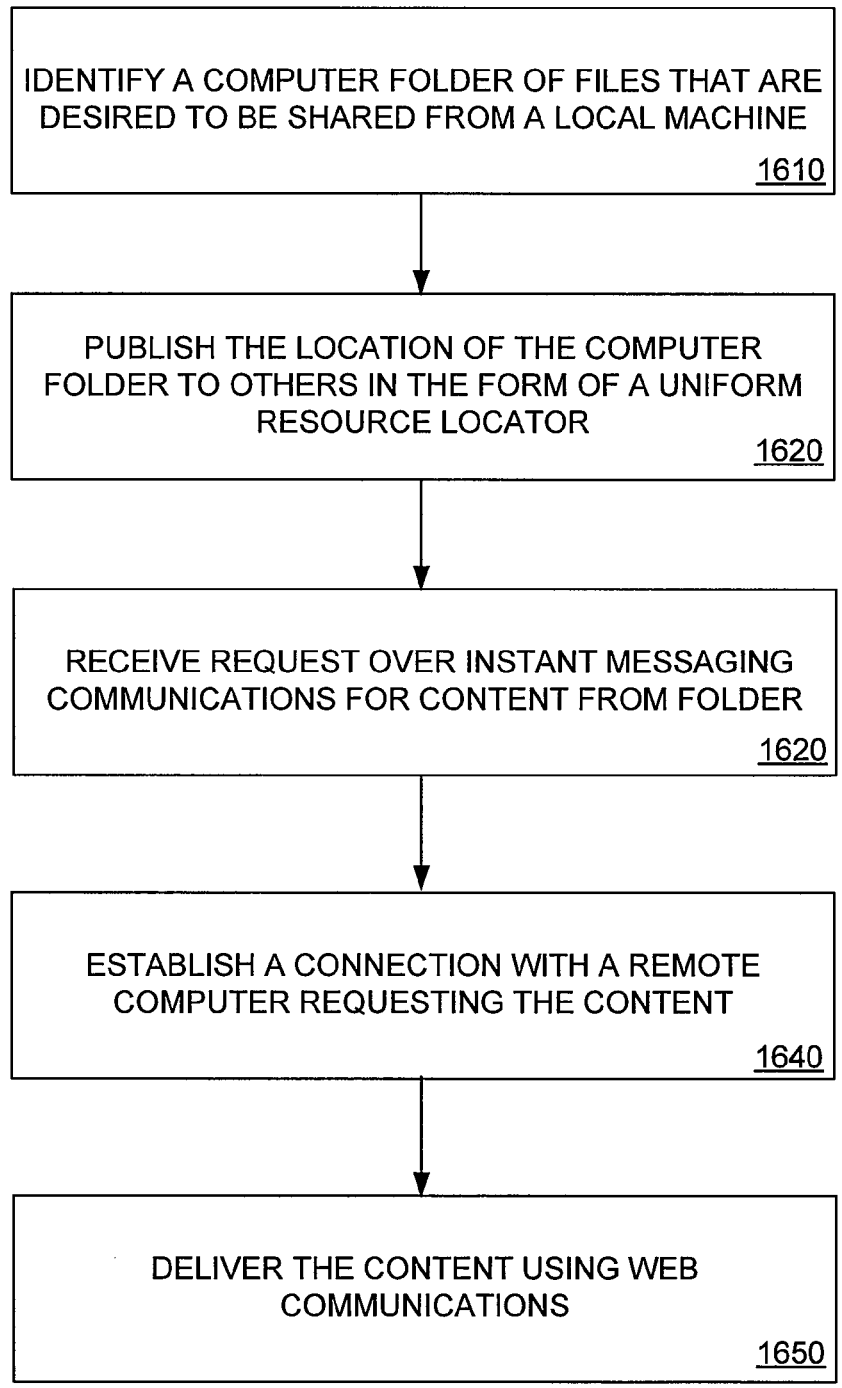
FIG. 16 is an embodiment of a method for file-sharing in accordance with the system of FIG. 1.

Referring now to FIG. 16, one embodiment of a method of file sharing is described. The method includes the step of identifying (1610) a computer folder of files that are desired to be shared from a local machine. The location of the computer folder is published (1620) to others in the form of a uniform resource locator (e.g., in a chat message, within presence information, etc.). In response to a request for content contained in the computer folder, the local machine receives (1630) the request over instant messaging communications and establishes (1640) a connection with a remote computer requesting the content. The content is then delivered (1650) using Web communications.

In accordance with the present disclosure, functionality of the distributed web publishing system 100 can be implemented in software (e.g., firmware), hardware, or a combination thereof. In one mode, components of the distributed web publishing system 100, such as IM Client 105, Web Server 140, and Reverse Proxy 145, Web Browser 165, IM Server 120, among others, are implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer 1700 that can implement components of the distributed web publishing system 100 of the present disclosure is shown in FIG. 17.

Figure 17:
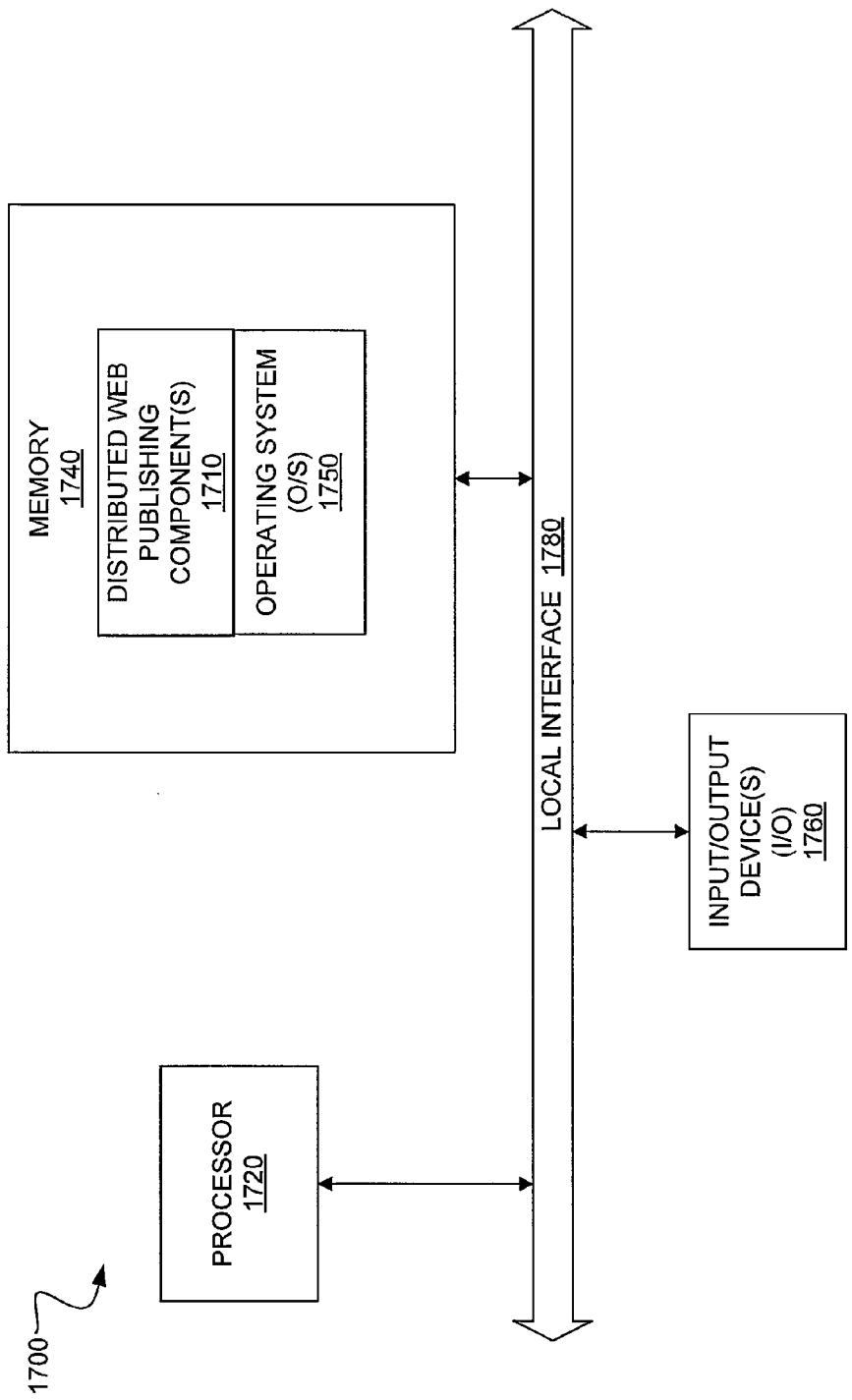
FIG. 17 is a block diagram of an embodiment of a computer system that can implement components of the distributed web publishing system of FIG. 1.

Generally, in terms of hardware architecture, as shown in FIG. 17, the computer 1700 includes a processor 1720, memory 1740, and one or more input and/or output (I/O) devices 1760 (or peripherals) that are communicatively coupled via a local interface 1780. The local interface 1780 can be, for example but not limited to, one or more buses or other wired or wireless connections, as is known in the art. The processor 1720 is a hardware device for executing software, particularly that stored in memory 1740. The processor 1720 can be any custom made or commercially available processor, a central processing unit (CPU), an auxiliary processor among several processors associated with the computer 500, a semiconductor based microprocessor (in the form of a microchip or chip set), a macroprocessor, or generally any device for executing software instructions.

The memory 1740 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1740 may incorporate electronic, magnetic, optical, and/or other types of storage media. Note that the memory 1740 can have a distributed architecture, where various components are situated remote from one another, but can be accessed by the processor 1720.

The software in memory 1740 may include one or more separate programs, each of which comprises an ordered listing of executable instructions for implementing logical functions. In the example of FIG. 17, the software in the memory 1740 includes the voice mail translation system 1710 in accordance with the present disclosure and a suitable operating system (O/S) 1750. The operating system 1750 essentially controls the execution of other computer programs, such as the voice mail translation system 1710, and provides scheduling, input-output control, file and data management, memory management, and communication control and related services.

Components of the distributed web publishing system 1710 may be source programs, executable programs (object code), scripts, or any other entity comprising a set of instructions to be performed. When a source program, then the program is translated via a compiler, assembler, interpreter, or the like, which may or may not be included within the memory 1740, so as to operate properly in connection with the O/S 1750.

The I/O devices 1760 may include input devices, for example but not limited to, a keyboard, mouse, scanner, microphone, etc. Furthermore, the I/O devices 1760 may also include output devices, for example but not limited to, a printer, display, etc. Finally, the I/O devices 1760 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When components of the distributed web publishing system 100 are implemented in software, it should be noted that the components can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Components of the distributed web publishing system 1710 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device.

It should be emphasized that the above-described embodiments are merely possible examples of implementations, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, having thus described the invention, at least the following is claimed:

1. A method comprising:
   receiving a request from a computer of a first user for creation of a uniform resource locator, wherein the uniform resource locater is used to identify content hosted on the computer of the first user, the computer of the first user comprising a local web serving module;
   assigning a base uniform resource locator to the first user, wherein the base uniform resource locator comprises a portion of the uniform resource locator;
   determining that the first user is available via an instant messaging service;
   determining that a second user is subscribed to presence information for the first user;
   responsive to determining that the first user is available via the instant messaging service and that the second user is subscribed to the presence information for the first user, presenting an icon on an instant messaging interface of the second user, the icon indicating that the first user is available via the instant messaging service, wherein the icon is associated with the uniform resource locator and located on the instant messaging interface proximate to an instant messaging identifier of the first user;
   receiving a request to retrieve the content hosted on the computer of the first user, wherein the request is generated by detecting a selection of the icon on the instant messaging interface of the second user;
   parsing the uniform resource locator to determine identification of the first user;
   requesting authorization from an instant messaging client configured on the computer of the first user to fulfill the request to retrieve the content hosted on the computer of the first user;
   receiving permission from the instant messaging client configured on the computer of the first user to fulfill the request to retrieve the content hosted on the computer of the first user; and
   forwarding the request to retrieve the content hosted on the computer of the first user to the computer of the first user for enabling the computer of the first user to establish a connection with a computer of the second user to deliver the content hosted on the computer of the first user using the web serving module.

2. The method of claim 1, wherein the base uniform resource locator further comprises information identifying an entity that created the base uniform resource locator.

3. The method of claim 1, further comprising returning the uniform resource locator to the computer of the first user.

4. The method of claim 1, wherein the computer of the first user enhances the uniform resource locator to form an enhanced uniform resource locator containing additional information identifying the content hosted on the computer of the first user.

5. The method of claim 4, wherein the additional information comprises identification of a sub-folder on a local machine of the first user.

6. The method of claim 1, wherein the base uniform resource locator comprises the instant messaging identifier of the first user.

7. The method of claim 1, further comprising determining that the first user is no longer available via the instant messaging service and, in response, removing the icon from instant messaging interface of the second user.

8. The method of claim 1, wherein the request from the computer of the first user for creation of the uniform resource locator is received over instant messaging communications.

9. The method of claim 1, wherein the request to retrieve the content hosted on the computer of the first user is received via instant messaging communications.

10. A computer readable storage medium having instructions stored thereon for performing operations comprising:
receiving a request from a computer of a first user for creation of a uniform resource locator, wherein the uniform resource locater is used to identify content hosted on the computer of the first user, the computer of the first user having stored thereon a local web serving module;
assigning a base uniform resource locator to the first user, wherein the base uniform resource locator comprises a portion of the uniform resource locator;
determining that the first user is available via an instant messaging service;
determining that a second user is subscribed to presence information for the first user;
responsive to determining that the first user is available via the instant messaging service and that the second user is subscribed to the presence information for the first user, presenting an icon on an instant messaging interface of the second user, wherein the icon is associated with the uniform resource locator and located on the instant messaging interface proximate to an instant messaging identifier of the first user;
receiving a request to retrieve the content hosted on the computer of the first user, wherein the request is generated by detecting a selection of the icon on the instant messaging interface of the second user;
parsing the uniform resource locator to determine identification of the first user;
requesting authorization from an instant messaging client configured on the computer of the first user to fulfill the request to retrieve the content hosted on the computer of the first user;
receiving permission from the instant messaging client configured on the computer of the first user to fulfill the request to retrieve the content hosted on the computer of the first user; and
forwarding the request to retrieve the content hosted on the computer of the first user to the computer of the first user for enabling the computer of the first user to establish a connection with a computer of the second user to deliver the content hosted on the computer of the first user using the web serving module.

11. The computer readable storage medium of claim 10, wherein the base uniform resource locator further comprises information identifying an entity that created the base uniform resource locator.

12. The computer readable storage medium of claim 10, the operations further comprising returning the uniform resource locator to the computer of the first user.

13. The computer readable storage medium of claim 10, wherein the computer of the first user enhances the uniform resource locator to form an enhanced uniform resource locator containing additional information identifying the content hosted on the computer of the first user.

14. The computer readable storage medium of claim 13, wherein the additional information comprises identification of a sub-folder on a local machine of the first user.

15. The computer readable storage medium of claim 10, wherein the base uniform resource locator comprises the instant messaging identifier of the first user.

16. The computer readable storage medium of claim 10, the operations further comprising determining that the first user is no longer available via the instant messaging service and, in response, removing the icon from instant messaging interface of the second user.

17. The computer readable storage medium of claim 10, wherein the request from the computer of the first user for creation of the uniform resource locator is received over instant messaging communications.

18. A system comprising:
a memory comprising executable instructions;
a transceiver; and
a processor communicatively coupled to the memory and the transceiver, the processor configured to execute the executable instructions to perform operations comprising:
detecting a request from a computer of a first user for creation of a uniform resource locator, wherein the uniform resource locater is used to identify content hosted on the computer of the first user, the computer of the first user comprising a local web serving module;
assigning a base uniform resource locator to the first user, wherein the base uniform resource locator comprises a portion of the uniform resource locator;
determining that the first user is available via an instant messaging service;
determining that a second user is subscribed to presence information for the first user;
responsive to determining that the first user is available via the instant messaging service and that the second user is subscribed to the presence information for the first user, presenting an icon on an instant messaging interface of the second user, the icon indicating that the first user is available via the instant messaging service, wherein the icon is associated with the uniform resource locator and located on the instant messaging interface proximate to an instant messaging identifier of the first user;
detecting a request to retrieve the content hosted on the computer of the first user, wherein the request is generated by detecting a selection of the icon on the instant messaging interface of the second user;
parsing the uniform resource locator to determine identification of the first user;
generating a request for permission to fulfill the request to retrieve the content hosted on the computer of the first user;
instructing the transceiver to transmit the request for permission to the computer of the first user;
detecting permission from the instant messaging client configured on the computer of the first user to provide the content hosted on the computer of the first user; and
instructing the transceiver to transmit the request to retrieve content to the computer of the first user for enabling the computer of the first user to establish a connection with a computer of the second user to deliver the content identified by the request using the web serving module.

19. The system of claim 18, the operations further comprising forming an enhanced uniform resource locator that identifies the content hosted on the computer of the first user by adding information to the base uniform resource locator to identify content stored on a local machine of the first user hosting the instant messaging module.

20. The system of claim 18, wherein the content is delivered from the computer of the first user over a connection established between the local web serving module and the computer of the second user.

21. The system of claim 20, wherein the content is delivered to a web browser of the second user.

22. The system of claim 18, wherein the computer of the first user further comprises a publishing module configured to publish the uniform resource locator to others.

23. The system of claim 19, wherein a second portion of the enhanced uniform resource locator is used to identify a location of the content on the local machine that can be retrieved using the enhanced uniform resource locator.

24. A system comprising:
a memory comprising executable instructions;
a transceiver; and
a processor communicatively coupled to the memory and the transceiver, the processor configured to execute the executable instructions to perform operations comprising:
  detecting a request from a computer of a first user for creation of a uniform resource locator, wherein the uniform resource locater is used to identify content hosted on the computer of the first user, the computer of the first user comprising a local web serving module;
  assigning a base uniform resource locator to the first user;
  providing the base uniform resource locator to the computer of the first user;
  receiving the uniform resource locator from the computer of the first user, the uniform resource locator comprising the base uniform resource locator and additional location information for the content hosted on the computer of the first user;
  determining that the first user is available via an instant messaging service;
  determining that a second user is subscribed to presence information for the first user;
  responsive to determining that the first user is available via the instant messaging service and that the second user is subscribed to the presence information for the first user, presenting an icon on an instant messaging interface of the second user, the icon indicating that the first user is available via the instant messaging service, wherein the icon is associated with the uniform resource locator and located on the instant messaging interface proximate to an instant messaging identifier of the first user;
  detecting a request to retrieve the content hosted on the computer of the first user, wherein the request is generated by detecting a selection of the icon on the instant messaging interface of the second user;
  parsing the uniform resource locator to determine identification of the first user;
  generating a request for permission to fulfill the request to retrieve the content hosted on the computer of the first user;
  providing the request for permission to an instant messaging client of the first user;
  detecting permission from the instant messaging client of the first user to fulfill the request to retrieve the content hosted on the computer of the first user; and
  instructing the transceiver to forward the request to retrieve the content hosted on the computer of the first user to the computer of the first user for enabling the computer of the first user to establish a connection with a computer of the second user to deliver the content hosted on the computer of the first user using the web serving module.

* * * * *